United States Patent [19]

Chen

[11] 4,215,797
[45] Aug. 5, 1980

[54] PLASTIC CONTAINERS AND LIDS THEREFOR

[75] Inventor: Alex C. Chen, Mississauga, Canada

[73] Assignee: Consumers Glass Company Limited, Etobicoke, Canada

[21] Appl. No.: 958,931

[22] Filed: Nov. 8, 1978

[51] Int. Cl.² .............................................. B65D 41/00
[52] U.S. Cl. .................................... 220/359; 229/43; 150/0.5; 220/276
[58] Field of Search ................ 220/359, 260; 215/232; 229/43 R, 48 AS; 150/0.5

[56] References Cited

U.S. PATENT DOCUMENTS

| | | | |
|---|---|---|---|
| 3,276,616 | 2/1964 | Lurie | 220/359 X |
| 3,501,042 | 3/1970 | Risch et al. | 215/232 |
| 4,044,941 | 8/1977 | Knudsen | 229/43 |

*Primary Examiner*—George T. Hall

[57] ABSTRACT

Reusable plastic container and plastic lid therefor, the lid being hermetically sealed to the container by a set adhesive. The set adhesive has a greater attraction for the lid plastic than for the container plastic. Such attraction is sufficient to ensure that, on removing the lid from the container, the adhesive is peeled from the container rim and removed with the reusable lid. This leaves the container rim essentially free of adhesive to reduce the likelihood of contaminating the contained product with adhesive chemicals. The lid or the container rim may be coated with the adhesive prior to heat-seal. In the instance where the container is coated with the adhesive, the rim ledge portion may be provided with at least one continuous circumferentially extending raised portion to facilitate coating of the container rim. Processes for manufacturing the adhesive-coated container lid and forming the container rim portion and applying adhesive thereto are disclosed.

9 Claims, 11 Drawing Figures

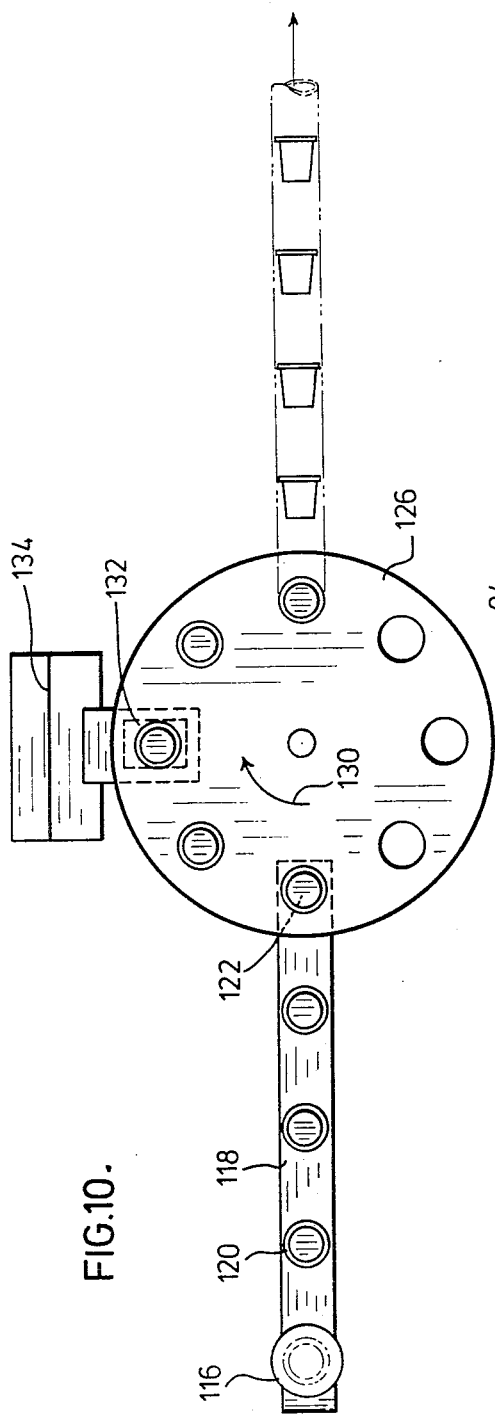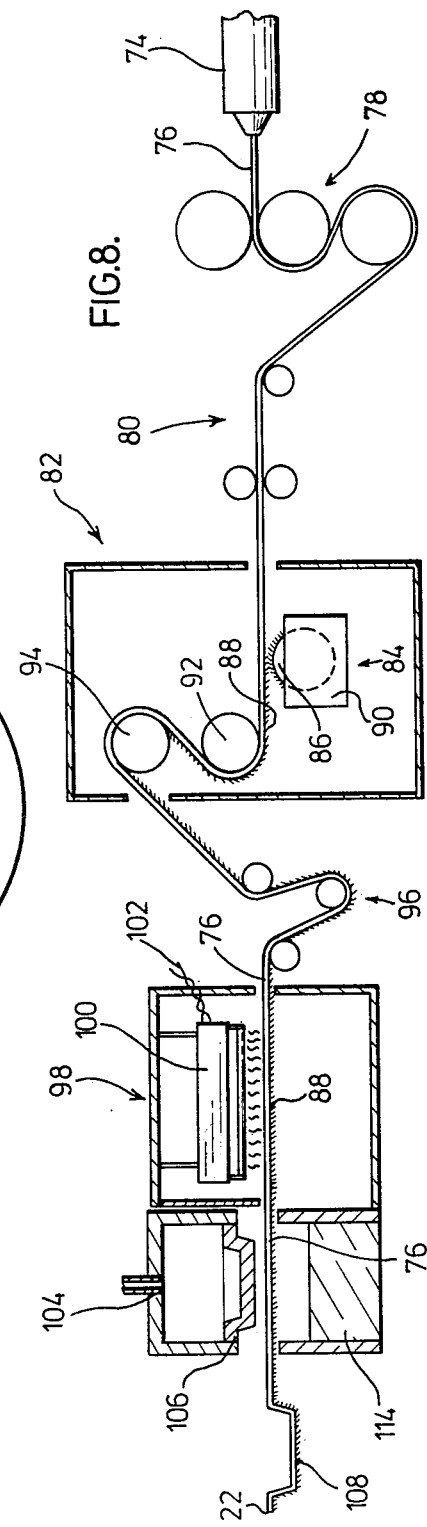

PLASTIC CONTAINERS AND LIDS THEREFOR

FIELD OF THE INVENTION

This invention relates to reusable plastic containers and lids therefor and processes for making such containers and lids, where the container is hermetically sealed by a lid with a set adhesive.

BACKGROUND OF THE INVENTION

With the increasing demand of packaging perishable goods for consumption, such as meat and dairy products, medicinal and cosmetic products in reclosable containers, it is advantageous to devise a packaging which is substantially less expensive than the standard glass jar with threaded cap and the like. Reusable plastic containers are suitable for this type of packaging because they are inexpensive to manufacture on a high speed basis, the plastic from the forming process is recyclable and the package, as waste, is recyclable.

Available on the market are plastic containers for perishable goods; however, the lids therefor which provide the hermetic seal on the container to maintain the freshness of the goods is usually not reusable. It is common, for example, to find a plastic container with an aluminum foil lid heat-sealed thereto to maintain the freshness of the product. Such foil is torn off the container leaving unsightly portions of foil on the container rim. An additional lid is usually provided with the container for reclosure of the container. Such a package is complex and results in wastage of the foil which is not reusable and adds costs to the package in terms of the required additional lid.

It is, therefore, desirable in packaging perishable goods to provide a container with a lid therefor which provides a hermetic seal and yet is reusable. The lid has a circumferential area which is heat-sealed to the container rim and another portion remote therefrom, which, in cooperating with a complementary portion on the container, provides for the reclosure of the container. In addition, the package, as heat-sealed, must be readily opened when it is desired to remove the heat-sealed lid from the container. Solvent-based types of adhesives have been used in providing a seal between lid and container. There are, however, several drawbacks in the use of solvent-based adhesives, such as the extended drying ovens required to remove the solvent from the applied adhesive and the problem of solvent recovery to prevent air pollution.

Other existing processes for providing layers of adhesive on lids have other drawbacks due to their complexity in application of adhesives to the substrate and the extended processing times required in forming lids for containers. Formed lids may be subsequently coated with solvent-based adhesives; however, due to to irregular shape of formed lids, there is usually an uneven layer of adhesive applied to the lid.

The reusable plastic container and plastic lid therefor and processes for making same of this invention overcome the above-identified drawbacks. The lids are readily manufactured on a high speed basis and are readily heat-sealed to containers. On reopening the heat-sealed container, the set adhesive is removed from the container rim. The process for coating the container rim with adhesive substantially reduces the amount of adhesive used and, therefore, cuts manufacturing costs.

SUMMARY OF THE INVENTION

To achieve this removal of the adhesive from the container rim when a heat-sealed container is opened, it has been found that an adhesive which has a greater attraction or affinity for the lid plastic than for the container plastic results in peeling the adhesive from the container rim and removing it with the reusable lid on opening a heat-sealed container. This aspect of the invention, therefore, provides a package for perishable goods which is a two-piece construction. The reusable lid provides a hermetic seal for the container, is removable from the container and upon such removal, peels the adhesive from the container rim to substantially reduce any possibility of chemically contaminating the contained products by adhesive falling thereinto.

A reusable plastic container may be provided with an adhesive about its rim. To facilitate the application of the adhesive to the rim, it has been found that the container rim may be modified wherein its ledge portion has at least one continuous circumferential raised portion of a height approximately less than twice the thickness of the ledge. Such raised portion allows the layer of adhesive applied to the container rim, by methods such as gravure application to flow to each side of the raised area. This prevents "tailing" or overflow of the adhesive to the outside of the rim or to the inner part of the container, thereby avoiding chemical contamination to goods to be placed in the container. The raised portion in the container rim may be formed during vacuum thermoforming, or injection molding of the container.

In instances, and according to an aspect of this invention, when it is desired to provide a hot-melt thermoplastic adhesive on the lid preparatory to heat-sealing the lid to the container, the inventive process comprises providing on a side of a sheet of thermoformable plastic lid substrate, an essentially uniform layer of such hot-melt thermoplastic adhesive. The applied layer of hot-melt adhesive is set by simply cooling without the need for extensive solvent recovery drying ovens. The coated sheet is heated to a thermoformable temperature of the plastic substrate and one or more lid shapes are vacuum formed in the sheet by the use of one or more male dies contacting the side of the sheet without the adhesive. This avoids contact with and disruption of the uniform adhesive layer. The so formed lids are die-cut from the sheet and the resulting scrap removed and recycled. The selection of the adhesive is such that it has a greater attraction for the lid substrate material than for the material of the container to ensure on opening of the heat-sealed container that the hot-melt adhesive is removed with the lid.

DESCRIPTION OF THE DRAWINGS

Preferred embodiments of the invention are shown in the drawings wherein:

FIG. 8 is a schematic of the apparatus for making the lids from a continuously formed sheet having a layer of adhesive applied thereto;

FIG. 10 is a schematic of apparatus for applying adhesive to the container rim of the type shown in FIG. 3.

DETAILED DESCRIPTION OF THE PREFERRED EMBODIMENTS OF THE INVENTION

Figure 1:
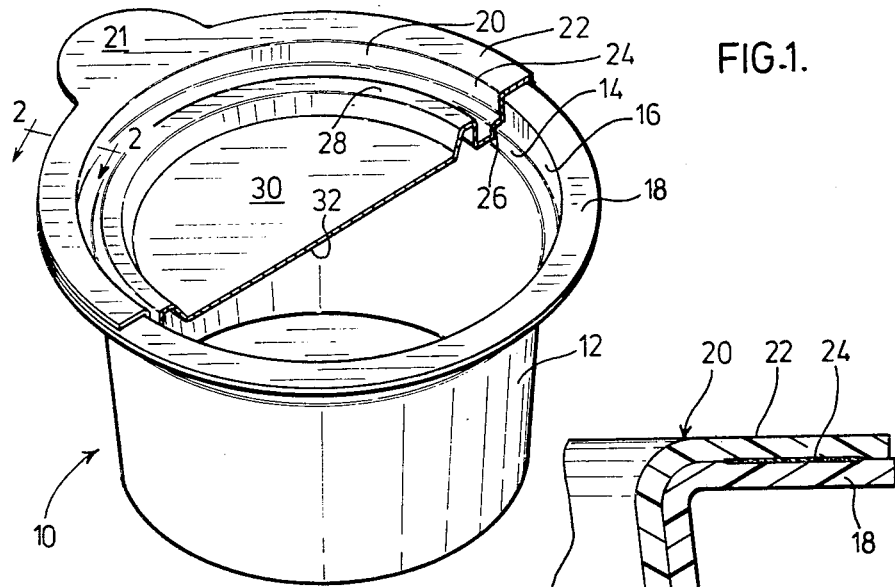
FIG. 1 is an isometric view of a container having a lid heat-sealed thereon, where a portion of the lid is removed to show details of the container lid reclosure.

A representative circular plastic container 10 is shown in FIG. 1 of the drawings. The container has outwardly sloping sidewall 12 merging into rim stacking shoulder 14, which continues upwardly into inwardly sloping annular wall portion 16 which mergers into rim portion 18. The shape of rim stacking shoulder 14, annular wall portion 16 and the container rim 18 are shown in more detail in FIG. 2.

The complementary lid 20 for the container has an outwardly projecting lip portion 22, downwardly extending annular portion 24 which has a lid stacking indent 26. This in turn merges into the lid base 30 which includes strengthening annular raised portion 28. The stacking indent portion 26, which extends circumferentially of the lid, is shaped so as to allow stacking of an upper lid on a lower lid for purposes of storing and machine dispensing for application to the open top of a container 10. The annular indent portion 24 in the lid cooperates with the inwardly tapered portion 16 of the container to provide a snap fit of the lid and the container to permit reclosure of the container. This reclosure aspect of the container is most desirable in instances where not all of the contained goods are consumed. The lid when placed back on the container, provides a sufficiently air-tight seal to lengthen the storage time of the goods under refrigeration such as yogurt, cottage cheese, pharmaceutical products, preserves, salads and the like.

Figure 2:
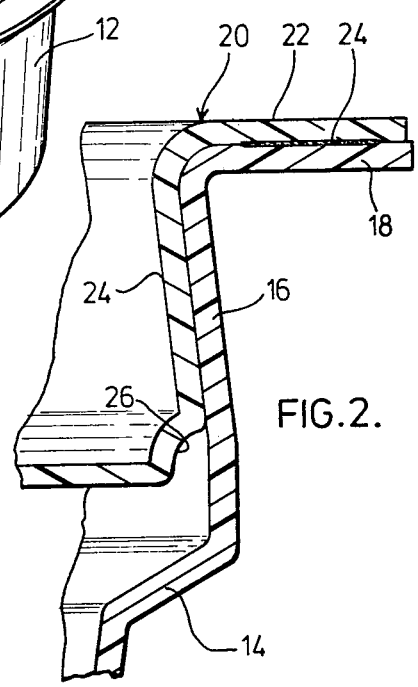
FIG. 2 is a section along line 2—2 of FIG. 1.

After the container is filled with the desired goods, the lid is hermetically sealed thereto by sealing the opposing lid and container portions; namely, the lip portion 22 of the lid to the container rim 18 around its entire circumference. In this particular embodiment, the lid 20 may be provided, at least around its lip portion 22, with a hot-melt thermoplastic adhesive which melts upon application of heat to the lip 22 by a heat-sealing device. On removal of the heat-sealing device, the hot-melt adhesive is allowed to set to provide a hermetic seal of lid to container to protect the contents. In this particular embodiment, both the lip 22 and rim 18 are planar to provide a flush contact in heat-sealing the two together. This relationship of the lid lip 22 and the rim 18 with the set adhesive 24 is shown in FIG. 2.

The lid 20 may be vacuumed thermoformed from a sheet of plastic wherein the entire underside of the lid 32 is coated with the hot-melt adhesive. The technique for forming such a lid will be discussed with respect to the schematic representation of the apparatus as shown in FIG. 8.

Figure 3:
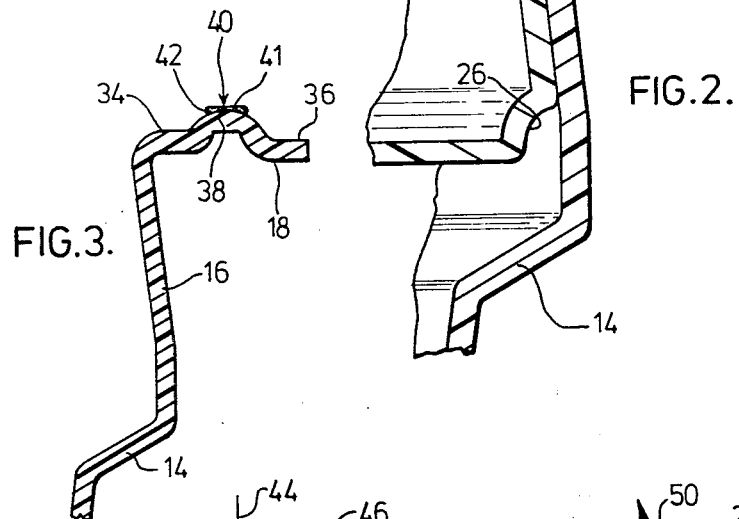
FIG. 3 is a section similar to FIG. 2 showing an alternative embodiment for the container rim configuration, having a layer of adhesive applied thereto.

As an alternative to coating the entire underside of the lid 20 in providing a reusable lid which may be heat-sealed to a container, it has been found that the container rim may be coated, or have applied thereto, a layer of adhesive which subsequently serves for a hermetic heat-seal of lid to container. The preferred shape for the container rim in facilitating the adhesive application is shown in FIG. 3. The container sidewall includes the stacking shoulder 14, the inwardly sloping annular wall portion 16 and rim 18. The rim 18 includes an inner ledge portion 34 and an outer ledge portion 36 where intermediate of the ledge portions is a raised bead portion 38. In this instance, the bead is formed in the rim by displacing such portion of the rim. A preferred form of apparatus may be used to apply the layer of adhesive to the container rim, such as that schematically shown in FIG. 10. A wheel coating device applies the layer of adhesive to the container rim to form a typical layer of adhesive 40 as shown in FIG. 3. The layer 40 consists of a central film or thin area of adhesive 41, to either or both sides of which may be larger bead portions 42 of adhesive. The adhesive remains with the container rim preparatory to having a lid hermetically sealed to the container. In so providing the bead 38 on the container rim, it has been found to avoid excess adhesive building on the rim. This prevents the adhesive from flowing over the outer ledge 36 and over the inner ledge 34 which could cause chemical contamination of the contained products during storage. It is appreciated, of course, that more than one circumferential bead 38 bay be provided depending upon the width of the rim. Further the height of the bead 38, as shown here, is approximately equal to the thickness of the rim; however, it may in some instances be less or greater and it may be possible to use a bead height which is approximately equal to twice the thickness of rim 18.

Figure 4:
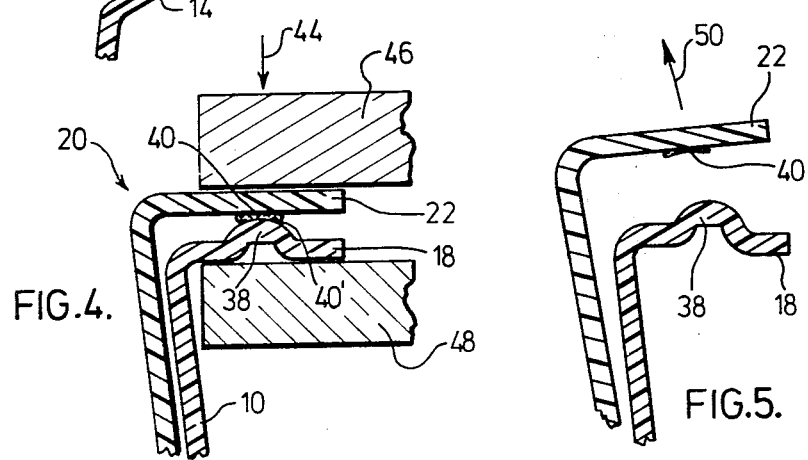
FIG. 4 shows in section the container rim and lid portion being heat-sealed thereto.

Referring to FIG. 4, a preferred arrangement for heat-sealing a lid 20 to the container 10 is shown. In this instance, a hot-melt thermoplastic adhesive had been applied to the container rim, pressure in the direction of arrow 44 is applied to the planar rim 22 by flat annular heated die block 46. Support 48 is beneath the container rim portion 18. The hot-melt adhesive 40 is sandwiched between the raised portion 38 of the rim and the lip 22. Heat is applied to hot-melt 40 as transferred through lid lip 22 by heated block 46. As will be understood by those skilled in the art, sufficient heat is transferred to the hot-melt 40 to melt same. Sufficient pressure is applied in this instance to very slightly deform and flatten the the raised area 38 to the extent shown in FIG. 4. This causes a secure bonding of the adhesive to the lid 22 and the rim 18 to provide a hermetic seal in closing the container to protect the contents. On removing the plates 46 and 48 of the heat-seal device, the hot-melt adhesive is allowed to set and provide the aforementioned bond.

The container of FIG. 1 with the lid sealed thereto provides a packaging system for perishable goods which are protected by the hermetic seal provided by the adhesive applied either to the lid or to the container rim preparatory to the heat-sealing step. The lid is provided with a reclosure means which in this embodiment is the annular portion 24 cooperating with the inwardly sloped portion 16 of the container. The reclosure means is remote from the area which is sealed to the container. On removal of the lid which has been sealed to the container, the reclosure portion remains unspoiled and has no adhesive applied thereto so that the container may be reclosed for refrigeration. This is particularly desirable for bulk packaging where considerably more than a single serving is placed in the container.

In making the lid of the package from a material different from that used in making the container, by proper selection of an adhesive and package materials, it has been found that a selected adhesive can have a greater affinity for the lid plastic than for the container plastic. This, of course, has no effect on the security of the seal while unbroken; however, it provides the following distinct advantage. On commencing the opening of a sealed container by gripping the lid tab portion 21, due to the adhesive's differential in affinity for the lid, the layer of adhesive is peeled from the container rim 18 and removed with the lid.

Figure 5:
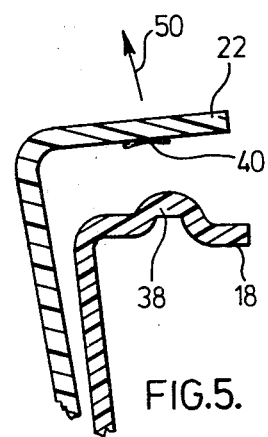
FIG. 5 is a section demonstrating the removal of lid from the heat-sealed container.
Figure 6:
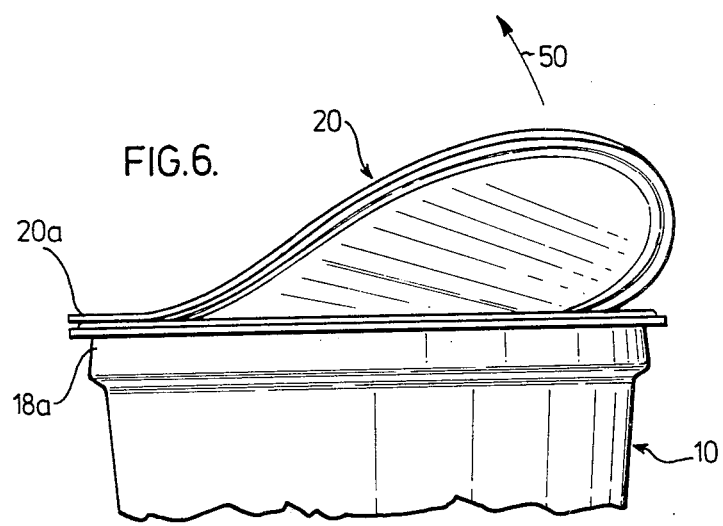
FIG. 6 is a side elevation showing a continued removal of the lid from the container as commenced in FIG. 5.

Referring to FIG. 5, a hot-melt thermoplastic adhesive had been applied to the container rim. On lifting the tab 21 in the direction of arrow 50, the set adhesive, in having a greater affinity for the lid 22, begins to peel from the rim 18 and upon continued removal of the lid results in substantially complete transfer to the lid. This unexpected advantage from the selection of adhesives, where the adhesive has been applied to the container rim and unexpectedly peels therefrom on opening the container, results in a package system where the adhesive is removed from the container so that the goods are not chemically contaminated by pieces of adhesive remaining on the container rim. The adhesive, in being removed with the lid, does not affect the reclosure aspect. Further the reclosure means provides, in its resistance to opening of the container, a slow gradual removal of the lid from the container to ensure a smooth peeling of the adhesive 40 from the container rim in its transfer to the lid. As shown in FIG. 6, this is demonstrated wherein the heat-sealed lid is partially opened in the direction of arrow 50. The remainder of the lid 20a remains in contact with the container rim 18a due to the combined effect of the set adhesive and the gripping of the closure system between lid and container. It is appreciated that in some instances not all of the adhesive would be removed from the container rim due to uncontrollable imperfections in the sealing process, contamination of the adhesive or foreign substances on the inner surfaces of the lid lip which prevents good bonding of the adhesive to the lid.

The presence of the raised portion 38 on the container rim also assists in the transfer of the adhesive 40 to the lid during opening of a sealed container. This is due to the resultant spacing between the lip 22 of the lid and the container rim 18 which provides an undercut area 40 in the adhesive bond to locate the action of initiating the peeling of the adhesive from the container rim.

The aforementioned greater affinity of the adhesive to the lid is thought to be due to physical and/or electrical attractions between the molecules of the adhesive and lid material. To attain a differential in this affinity, the van der Waal forces, hydrogen bonding or other attractions between molecules of the adhesive and the lid must be greater than between the molecules of the adhesive and the container. For example, in using an ethylene-vinylacetate hot-melt thermoplastic adhesive with an acrylic multipolymer lid, the acetate molecules of the adhesive have a greater affinity for the molecules of the acrylic multipolymer than for the molecules of the high impact polystyrene container. This difference in affinity is sufficient to ensure a greater bonding of the adhesive to the lid than to the container, yet maintain the desired hermitic seal on the container after heat-sealing. However, in removing the lid from the heat-sealed container, as previously explained, this differential in affinity results in the transfer of the adhesive from the container rim to the lid.

As an alternative to the hot-melt adhesive applied to the container rim, a layer of pressure-sensitive adhesive may be applied. Such pressure-sensitive adhesive may be in the form of a water-based emulsion prior to its application. With proper selection of the pressure-sensitive adhesive, the above-discussed greater affinity for the lid may be realized to achieve the desired transfer of adhesive from container rim to lid on removing lid from the container. With this type of adhesive, it is necessary to apply pressure to opposing portions of lid and container rim to effect the desired hermetic bonding of lid to container.

Figure 7:
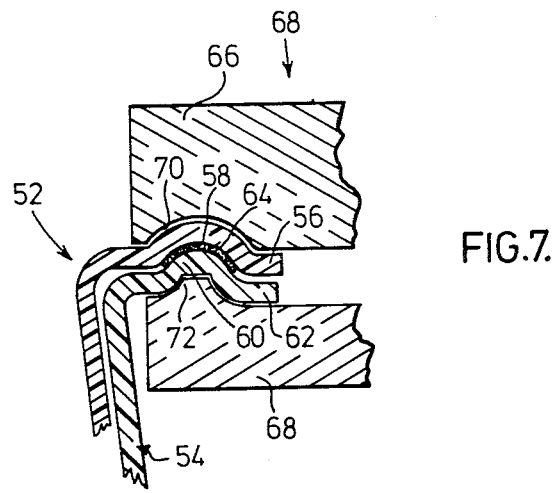
FIG. 7 shows in section another embodiment respecting the mating fit of lid to container rim and the design of heat-seal plates which affect the heat-seal.

Turning to FIG. 7, an alternative arrangement for a container lid 52 as it cooperates with container 54 which in this embodiment is heat-sealed thereto. The lip portion 56 includes a recess 58, which mates with the shape of the raised portion 60 on the container rim 62. Sandwiched between the lid and container is a layer of adhesive 64 which had been previously applied to the container rim in a manner such as that to be discussed with respect to FIG. 10. The heat-sealing plates 66 and 68 of the heat-sealing device are correspondingly shaped where die 66, which is heated and pressed downwardly in the direction of arrow 68, includes a recessed portion 70 to receive the raised area on the upper edge of the lip 56. The support portion 68 includes a annular ridge portion 72 which projects into the resulting recess on the underside of container rim 62. Such an arrangement provides more uniform contact of the adhesive between container lid and rim. In some instances this results in a better seal by providing a more uniform heating of the hot-melt adhesive. This can also enhance the affinity of the set adhesive for the lid to ensure a peeling of the adhesive from the container rim on opening the heat-sealed container.

It is common to provide reclosable lids for containers by vacuum forming them from a sheet of thermoformable plastic. In the past it has been the practice to coat the lid with an adhesive substance after it has been vacuumed formed to provide for subsequent heat-sealing of lid to container. This usually results in an uneven distribution of adhesive on the lid due to the irregularities of the lid.

Turning to FIG. 8, schematically is shown an apparatus in which a process is carried out for forming a lid from a sheet of plastic which already has applied thereto a layer of hot-melt adhesive. The sheet of plastic, from which the lids are to be formed, is withdrawn from an extruder head 74 which extrudes a relatively thin sheet of plastic material 76 onto chill rollers generally designated 78. The now cooled sheet of material is fed through roller system 80 into compartment 82 which houses a hot-melt adhesive applicator 84. The applicator has a wheel 86 which applies to the underside of sheet 76 a layer of hot-melt 88 from the hot-melt reservoir 90. The now coated sheet is passed over chill rollers 92 and 94 to lower the temperature of the hot-melt to the point where it is no longer tacky. The sheet is then passed over further tensioning rollers and delivery rollers 96 to position the sheets for travel through an oven 98 which heats the sheet via, in this instance, infrared lamps 100 fed by power conductor 102 to a temperature such that it may be readily thermoformed. It has been found in using hot-melts having relatively high viscosities up to approximately 5,000 cps at 300° F. and as low as 600 cps at 300° F., that the hot-melt remains on the sheet during this heating step in preparation for the thermoforming of the lids from the sheet.

The sheets exits from the oven 98 and passes to the thermoforming station 104. A male die 106 contacts the upper uncoated side of the sheet 76 to vacuum form therein the lid shape. The sheet is then advanced to the next station where the formed lid 108 is die-cut from the sheet. The scrap resulting from the die-cut operation is continuously removed from the system to provide a continuous expeditious process for manufacturing lids on a high production basis.

Figure 9:
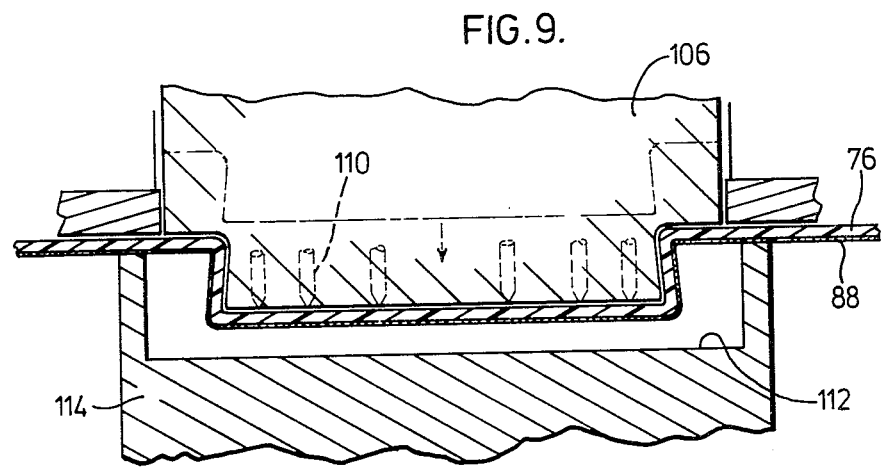
FIG. 9, located on the sheet of drawings with FIGS. 6 and 7, shows in section the configuration of the male die for vacuum thermoforming the lids in the sheets.

Referring to FIG. 9, the shape and function of the male die 106 is shown in more detail. The male die is provided with vacuum ports 110 to which vacuum is applied as the male die is pushed against and into the sheet 76. On the underside of the die 106, is an open recessed area defined by the boundary 112 of mandril 114. The vacuum causes the heated sheet of material to take on the shape of the external surfaces of the male die 106 to give the desired lid shape. The male die is then extracted from the formed lid. An important aspect of this arrangement is in the provision of a die which does not contact the side of the sheet which carries the adhesive. It has been found that the underside of the sheet may be coated with a hot-melt adhesive by a simple economical wheel applicator and that such sheet may be passed directly through the heating oven 98 to bring the sheet to the desired temperature without loss of adhesive from the underside of the sheets. It has also been found that such hot-melt adhesive does not leave the underside of the lid during the vacuum forming operation. As a result, a lid is produced which has on the underside thereof and in particular the lid portion 22, a uniform coating of hot-melt adhesive to facilitate subsequent heat-sealing of the lid to complementary container.

It is understood, of course, that co-extrusions may be provided from various types of plastic to form a sheet 76 having several layers. On the upper side may be a tough oxygen impervious layer with intermediate layer of scrap material and a bottom layer of material for which the adhesive has a greater affinity than for the container plastic.

It is understood that other methods of applying or providing a layer of hot-melt adhesive on the sheet from with lids are formed may be employed. Examples of other methods for making the lid involve co-extruding a layer of the selected hot-melt adhesive together with the layers for the lid substrate. In co-extruding the sheet, care must be taken not to disrupt the uniformity of the sheet in applying sufficient cooling to protect the adhesive and not to attain temperatures which degrade the characteristics of the adhesive. Other techniques involve the use of gravure, extrusion or curtain coating of the sheet with the hot-melt, or in some instances, the hot-melt may be sprayed onto the substrate.

Figure 11:
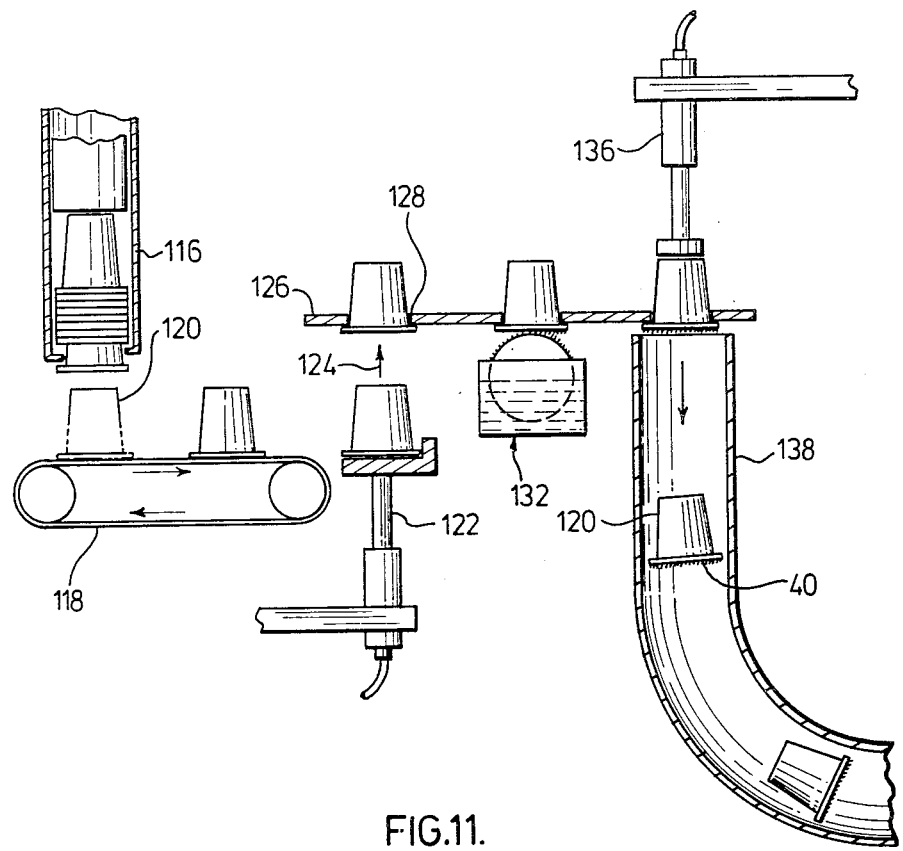
FIG. 11 is a side elevation of the apparatus schematically shown in FIG. 10.

FIGS. 10 and 11 schematically illustrate apparatus in which a process may be carried out for coating the rims of the containers. A supply of containers 116 are individually dropped onto conveyor 118. The containers 120 are transferred to a reciprocating plunger device 122 which is timed to push the containers individually upwardly in the direction of 124 to be received by the rotating carousel 126. The carousel plate 126 includes apertures 128 which are of a size to permit the plate to snugly receive the containers about the base of rim stacking shoulder 18. The carousel rotates in the direction of arrow 130 to pass each container rim above a wheel applicator 132 which applies to the surface of the container rim a layer of adhesive from the hot-melt adhesive reservoir 134.

The position of the carousel 126 is such to ensure that the wheel 132 is slightly spaced apart from the raised bead portion on the container. The spacing between the wheel and the raised bead portion determines the thickness of the layer of adhesive applied to the container rim. Where the wheel applicator 132 rotates in the same direction and at the same speed as the movement of the container 120 determined by carousel 126, usually a layer of adhesive is applied to the raised bead portion of a thickness approximately 75% of the thickness of the adhesive carried by the wheel. For example, should it be desired to apply approximately a 3 mil thickness of adhesive to the bead, where the wheel carries approximately a 4 mil thickness of adhesive, it has been found that, in spacing the bead 3 mil from the wheel, the desired thickness of adhesive is applied to the rim. Due to imperfections in the rim height around the container, the raised portion allows adhesive to flow down either side or both sides of the bead to take up and thereby prevent excess adhesive being pushed to the outside of the rim or to the inside of the container. This, as mentioned, avoids chemical contamination of the products to be stored in the container and results in a fairly uniform layer of adhesive being applied to the rim portion. Continued rotation of the carousel 126 passes the containers, as coated, to reciprocal ram 136 which forces the containers downwardly and outwardly away from the carousel onto conveyor system 138.

The type of heat-seal device, as shown in the drawings, is a thermoconduction type device which applies heat to the area which is to be heat-sealed. It is, of course, understood that other types of heat-sealing devices may be used, such as high frequency heat-sealing devices which may be used with substrates containing polar molecules such as polyvinyl chloride. Another example of a heat-seal device, which may be employed, is a magnetic heat-sealing unit which requires incorporating into the layer of adhesive finely divided iron particles which, when exposed to a high strength magnetic field, heats the layer of adhesive to achieve the desired bonding.

Various lid and container substrates may be used, such as those already discussed, and among others include:

| Substrate | Supplier |
| --- | --- |
| High impact polystyrene (HIPS) (Styron 456*) | Dow Chemical |
| Polyurethane: Texan* 480A Texan* 985A (used as heat resistant coating for HIPS in co-extrusion) | Bayer |
| Polyvinylchloride (PVC) | Hoechst |
| Acrylic (Cyrolite* G-20) | Cy/Ro Industries |
| Polypropylene (PP) | Shell Chemical |
| Styrene-Maleic Anhydride Copolymer (Dylark* 240) | Arco Polymer |

*(trademark)

Various types of adhesives may be used in the hot-melt category such as ethylene-vinylacetate copolymer (EVA), ethylenethyacrylate copolymer (EEA), ethylenemethylacrylate copolymer (EMA), low density polyethylene (PE), polyvinylacetate (PVA), polyamide (PA). Such examplary adhesives may be obtained from the following suppliers:

| Adhesives | Suppliers |
|---|---|
| EVA (5.5% VA) | Exxon Chemical |
| EVA (10-18% VA) | Dupont |
| EVA Hot Melt H009 | Industrial Adhesives |
| EVA Hot Melt (Evacote* 7611) | International Waxes |
| EEA | Union Carbide |
| EMA | Gulf Oil Chemical |
| PVA (NA3944) | Parrie Adhesives Ltd. |

*(trademark)

In view of the government regulations in some countries respecting the amount of chemical components which may come into contact with consumable goods, the most acceptable container composition is high impact polystyrene and the most acceptable lid composition is acrylic multipolymer. It has been found that, to give an excellent seal which is peelable, for the combination of acrylic lid and high impact polystyrene container, in using heat conduction-type heat-sealing device, the temperature of the plates was approximately 300° to 360° C. If teflon coating is used on the plates, a higher plate temperature is required. Such high temperatures may be in the range of 400° F. to 460° F. The plastics were held under pressure for approximately 1 to 2 seconds. This pressure was in the range of 20 to 45 psi. The selected adhesive was an EVA, such as "Evacoat" (trademark) supplied by International Waxes. Such adhesive has a greater affinity for the lid substrate than for the container substrate, so that on opening the heat-sealed container, the adhesive was transferred from the container rim to the lid on lid removal.

As mentioned, pressure-sensitive adhesive may be used as applied to container rim or lid. The water-based emulsion is particularly suitable for application to the container rim and may be applied using the wheel applicator of the type described in FIG. 10. The selection of the pressure-sensitive adhesive may be such to provide the desired greater affinity for the lid composition than for the container composition. An example of such combination would be for a high impact polystyrene container, acrylic lid and an acrylic copolymer pressure-sensitive adhesive, such as that provided by the Grace Chemical Limited and sold under the trademark "Daratak 74L". The emulsion, as applied to the container rim, is allowed to dry by evaporation of the water where there is no need for solvent recovery and no hazard in the working environment. To effect the seal of the lid to the container, pressure is applied to the opposing surfaces of lid and container rim to effect the desired hermetic seal. Due to the acrylate based adhesive having a greater affinity for its like family of polymers in the acrylic lid, on opening the sealed container, essentially all of the thin layer of adhesive is peeled from the container rim and removed with the lid.

It is appreciated that, in using various types of hot-melt adhesives with the lids and containers, variations in the heat-seal temperatures and pressure dwell time will be necessary. It should also be noted that terpene-phenolic resins may be incorporated in the ethylene-vinylacetate copolymer hot-melt to improve its hot tack and grease resistance during the heat-seal and setting of the adhesive.

The package system of this invention provides a container which may be reclosed. It includes a hermetic seal of lid to container where opening of such heat-seal container does not disturb the reclosure aspects thereof. The significant advantage of using an adhesive with differing lid and container substrates where the adhesive has greater affinity for lid than container to provide transfer of adhesive from container rim to lid on opening of the heat-seal container, avoids chemical contamination of the contained products.

The advantages of the process in providing raised areas on the container rim portion to ensure uniform distribution of a layer of hot-melt adhesive around the container rim substantially reduces the quantity of adhesive used. The provision of the raised area on the rim has the additional advantage of preventing "tailing" or displacing the layer of hot-melt adhesive to the inside of the container lip, thereby avoiding chemical contamination of products which are to be placed into the container prior to the heat-sealing operation.

The process for making the lids, when it is desired to coat lids with an adhesive, provides a compact economical approach to forming lids. A simple layering of adhesives on the underside of the sheet with a wheel coating device may be used. Subsequent thermoforming of the lid does not detract from the quality of the adhesive coating.

Although various preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. Reusable plastic container in combination with reusable plastic lid, said lid being hermetically sealed to said container by a set hot-melt thermoplastic adhesive between opposing surfaces of cooperating lid and container rim, a layer of said adhesive having been applied to said container rim prior to said lid having been heat-sealed to said container rim, said thermoplastic adhesive when set having a greater affinity for the lid plastic material than for the container plastic material, such affinity being sufficient to ensure that on removing said lid from container, such thermoplastic adhesive is peeled from the container rim and thereby removed with the reusable lid.

2. Reusable plastic container of claim 1 wherein said lid and container are provided with releasable cooperating closure means to permit reclosure of the opened heat-sealed container and lid, said closure means being remote from said opposing surfaces which were heat-sealed together by the set adhesive.

3. Reusable plastic container of claim 1 wherein said container plastic is of high-impact polystyrene, said lid plastic is an acrylic multipolymer and said hot-melt adhesive is ethylene-vinylacetate copolymer composition.

4. Reusable plastic container of claim 1 wherein said container rim has a ledge portion with at least one continuous circumferentially extending portion of a height less than twice the thickness of said ledge, said container having said adhesive about its ledge portion.

5. Reusable plastic container of claim 4 wherein each of said at least one raised portion is a bead extending around said rim.

6. Reusable plastic container of claim 5 wherein a single bead extends around said rim, a ledge portion extending around the outer periphery of said bead and another ledge portion around the inner periphery of said bead.

7. Reusable plastic container of claim 4 wherein the lid therefor has a continuous circumferentially extending recess portion adapted to mate with said raised portion on the container rim.

8. Reusable plastic container of claim 4 wherein the outermost raised portion assists in commencing such peeling of said set adhesive from the rim of a heat-sealed container by virtue of said raised portion providing an area of separation between lid and container rim.

9. Reusable plastic container and plastic lid therefor, said lid plastic being an acrylic multi-polymer, the lid being hermetically sealed to said container by a set hot-melt ethylene-vinylacetate co-polymer adhesive composition between opposing surfaces of cooperating lid and container rim, said container plastic being a high impact polystyrene, said adhesive when set having a greater affinity for the lid plastic material than for the container plastic material, such affinity being sufficient to ensure that on removing said lid from said container, such thermoplastic adhesive is peeled from the container rim and thereby removed with the reusable lid.

* * * * *